United States Patent Office 3,149,101
Patented Sept. 15, 1964

3,149,101
PROCESS FOR THE PREPARATION OF HETERO-
ATOM CONTAINING ORGANIC COMPOUNDS
Karl W. Hubel and Emile H. Braye, Brussels, Belgium,
assignors to Union Carbide Corporation, a corporation
of New York
No Drawing. Filed June 15, 1960, Ser. No. 36,131
10 Claims. (Cl. 260—239)

This invention relates to the preparation of organic compounds. More particularly, it relates to a process for the preparation of heterolinear and heterocyclic organic compounds.

The present invention greatly facilitates the synthesis of hetero-atom containing organic compounds in that it provides a new and general one-step method for this purpose. The lack of such a general method has heretofore sharply restricted the number of heterolinear and heterocyclic compounds (particularly the latter) to a relatively small amount.

According to this invention, a process for the preparation of heterolinear and heterocyclic organic compounds comprises reacting a butadiene derivative having the formula:

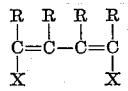

wherein X represents a halogen and R represents a member selected from the class consisting of hydrogen, and alkyl and aryl groups; with a reactant represented by the formula:

$$(A)_z E(R')_y$$

wherein A represents a member selected from the group consisting of an alkali metal, and an alkaline earth metal; E represents an element selected from the group consisting of gold, zinc, cadmium, mercury, boron, aluminum, gallium, indium, thallium, the lanthanides, silicon, germanium, tin, lead, titanium, zirconium, hafnium, nitrogen, phosphorus, arsenic, antimony, bismuth, vanadium, niobium, tantalum, oxygen, sulfur, selenium, tellurium, iron, cobalt, nickel, palladium, and platinum; R' represents a member selected from the class consisting of hydrogen and alkyl and aryl groups; z is an integer having a value of from 1 to 2; and y is an integer having a value of from 0 to 4. Obviously, the sum of z and y must be such that the valence of E is satisfied.

Employing a monofunctional reactant, i.e. where z is equal to 1, the compounds formed by the process of this invention will have the following structure:

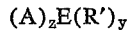

wherein R, R' and E have the meanings previously defined.

Employing a bi-functional reactant, i.e. where z is equal to 2, the compounds formed will have the following structure:

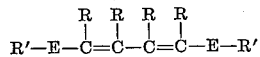

wherein E, R, and R' have the meanings previously defined and in which $m$ represents a value of from 0 to 2, i.e. the number of R' substituents are determined by the remaining unfilled valences, if any, of E.

For the purposes of this invention, the term "alkali metal" designates the metals lithium, sodium, potassium, rubidium and cesium. The term "alkaline earth metal" designates the metals calcium, strontium and barium.

Among the reactants particularly preferred for the practice of this invention are dihalogeno butadienes in which R is either a hydrogen or phenyl group and X is chlorine or iodine; and those reactants therewith in which A is sodium or lithium.

Therefore, exemplary of the dihalogeno butadienes useful in the practice of this invention are 1,4 dichloro butadiene and the heretofore unknown 1,4 diiodo tetraphenyl butadiene. The method of preparation of the latter compound will be clearly indicated in an example which follows hereafter.

Exemplary of the monofunctional reactants useful in the practice of this invention for reaction with the butadiene derivative are alcoholates such as $NaOC_2H_5$, $LiOC_2H_5$, amides such as $NaNH_2$, $NaN(CH_3)_2$, $NaN(C_6H_5)_2$, mercury mercaptides such as $Hg(SCH_3)_2$, phosphides such as $$LiP(C_6H_5)_2, \text{ and } NaP(C_6H_5)_2, LiAs(C_6H_5)_2$$

$LiGe(C_2H_5)_3$, $NaSn(C_6H_5)_3$, alkali derivatives of selenols and tellurols such as $CH_3SeO_2Na$.

Exemplary of the bifunctional reactants useful in the practice of this invention are alloys of metals selected from the I, II, III or IV Groups of the periodic table such as for instance, sodium amalgam, sodium-gold alloys, sodium-lead alloys, zinc or cadmium alloys, gallium, indium and thallium alloys, alkali derivatives of germanium, tin, lead such as $Na_2Ge(C_6H_5)_2$, $Na_2Sn(C_6H_5)_2$, alkali derivatives of nitrogen, phosphorus, arsenic, antimony and bismuth such as $Na_2P(C_6H_5)$, $Li_2P(CH_3)$, $Na_2NC_6H_5$, $Na_2AsCH_3$, $Na_2SbC_6H_5$, $Na_2BiC_6H_5$, alkali derivatives of sulfur, selenium and tellurium such as $Li_2S$, $K_2S$, $Na_2Se$, $Li_2Se$, $Na_2Te$ and $Li_2Te$ including polysulfides, polyselenides and polytellurides.

For the practice of this invention it is preferable to employ at least stoichiometric amounts of the starting materials. The reaction is also usually carried out in a polar or non-polar organic solvent such as ether, Cellosolve, Carbitol, tetrahydrofuran, dioxane, dimethoxy ethane and the like.

The process of this invention is generally carried out at temperatures of between —50° C. and 200° C. However, a temperature range of between 20° C. and 220° C. is preferable.

Pressures required by the process of this invention are not highly critical. However, it is preferable when employing high volatile reactants to employ a closed system and an inert atmosphere. In some instances it is also advisable to conduct the reaction at the temperature of liquid ammonia.

The reaction products are easily removable from the reaction mixture after completion of the reaction using conventional techniques such as, for example, chromatography. However, the technique will of course vary according to the nature of the reaction product. Suitable process conditions will be further illustrated in the specific examples hereinafter described relating to the present invention.

As mentioned previously, the process of this invention will result in a wide variety of compounds, the compounds being produced in comparatively superior yields. In this regard, similar hetero-containing compounds have been produced by the process described in copending application Serial No. 18,805, filed in the names of K. W. Hubel and E. Braye, on March 31, 1960. In that application a suffix "ole" was employed to generally designate the five-membered heterocyclic systems. Such nomenclature will also be hereinafter employed to refer to many of the heterocyclic compounds produced by the process of this invention. This nomenclature will be more apparent from the following list of purely representative compounds which may be produced by the process of this invention:

Tetraphenylselenophene
Tetraphenyltellurophone
Pentaphenylphosphole
Benzyltetraphenylphosphole
P-methyl-P.oxide-tetraphenylphosphole
Pentaphenylarsole
Pentaphenylstibole and oxide thereof
Hexaphenylsilole
Tetraphenyl-mercurole
Zr bis(cyclopentadienyl)-tetraphenyl-zirconole
Pentaphenyl-borole
Pentaphenyl-thallole
Hexaphenyl-stannole The process of this invention is particularly applicable to the preparation of hetocyclic systems containing elements selected from Groups V and VI of the periodic table, i.e. nitrogen, phosphorous, arsenic, antimony, bismuth, vanadium, niobium, tantalum, oxygen, sulfur, selenium and tellurium. This is so because the alkali metal derivatives containing these atoms are readily available. However, it is to be understood that the other elements designated by "E" can also be prepared though with less facility.

The preparation of elements other than the above-indicated members of Groups V and VI can be facilitated by the following modifications to the subject invention:

(I) The dihalogeno-butadiene may be first metallated, as for instance by reaction with butyl lithium and then reacted with a difunctional halide of the desired hetero element. It is to be noted that this reaction proceeds in situ to the formation of the desired hetero compound without the need of isolating any intermediate products.

(II) Another modification comprises the reaction of a dihalogeno-butadiene with a difunctional halide of the desired hetero element in the presence of an alkali or an alkaline earth metal, in an inert medium. A typical example of such reaction may be expressed in the following equation:

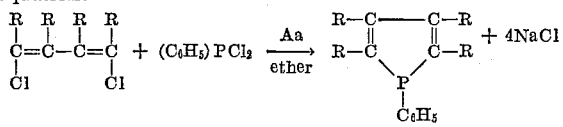

The invention may be further illustrated by the following examples.

Example I 20 g. of diphenylacetylene, dissolved in 40 ml. of dry ether were shaken for 2 hours in an inert atmosphere, with 1 g. of clean lithium shavings. The red brown mixture was diluted with ether to a volume of 100 ml. and then the lithium shavings were removed mechanically. This solution was added dropwise to an ethereal suspension (50 ml.) of 22.9 g. of iodine (amount calculated assuming a conversion of 80% of the diphenylacetylene). The reaction was exothermic and violent, and hence required some cooling. The reaction mixture was filtered and the precipitate washed with water and methanol and was identified as 1,4-diiodo-1,2,3,4-tetraphenyl-butadiene (yield: 22.4 g.). From the filtrate, a second crop of 1.8 g. was also recovered. The total yield was found to be 71%, calculated on diphenylacetylene. The final product was easily recrystallized from $CH_2Cl_2/C_2H_5OH$. It was found to have a melting point of 200–202° C.

Analysis.—Calculated for $C_{28}H_{10}I_2$ (mol. w.: 610, 29):

|  | C Percent | H Percent |
| --- | --- | --- |
| Found | 55.17 | 3.34 |
| Calculated | 55.10 | 3.30 |

Example II 2 g. (3.27 mM.) 1,4-diiodo-1,2,3,4-tetraphenylbutadiene and 0.5 g. $Li_2S$ (10.9 mM.) were refluxed in 125 ml. boiling "carbitol" ($C_2H_5OCH_2CH_2OCH_2CH_2OH$) for 3 hours. The reaction mixture was poured into 1 liter of water; extraction with benzene and crystallization from ethanol, gave 1.15 g. (90%) tetraphenylthiophene.

Example III 0.5 g. $Li_2Se$ and 2 g. 1,4-diiodo-tetraphenylbutadiene were refluxed for 4 hours in 125 ml. boiling "carbitol." Using the procedure of Example II, a yield of 99.5% (1.42 g.) of tetraphenyl-selenophene was obtained.

Example IV 1 g. lithiumtelluride and 2 g. 1,4-diiodotetraphenyl-butadiene were reacted in boiling "carbitol" (125 ml.; 1 hour) and yielded 0.77 g. (49%) tetraphenyltellurophene. This compound had the structure

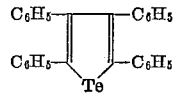

Example V 0.6 g. Na (4×6.55 mM.) was dispersed in 50 ml. mesitylene; at 100° C., one added 1.17 g. (6.55 mM.) $C_6H_5PCl_2$ and the mixture was refluxed for one hour, forming a fine suspension of $C_6H_5PNa_2$. 4 g. (6.55 mM.) 1,4-diiodotetraphenyl-butadiene was then added and refluxing was continued for 7 hours. The reaction mixture was washed with water and the organic layer chromatographed on silicagel. The products were:

Pentaphenyl-phosphole (88% based on reacted diiodide)
Pentaphenyl-phosphole-oxide
Unreacted 1,4-diiodo-tetraphenyl-butadiene.

The pentaphenyl-phosphole may be represented by the structure

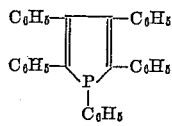

Example VI

The amalgam formed by dissolving 1 g. of sodium in 10 ml. of mercury under toluene, was shaken for 14 hours at room temperature with 5 g. of diiodo-tetraphenyl-butadiene in about 50 ml. toluene. Following the procedure of Example I a mercury-containing compound was formed which may be represented by the following structure

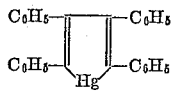

Example VII

To a solution of 0.5 g. azobenzene in 100 ml. liquid ammonia, 0.3 g. of sodium was added. After 2 hours stirring (brown solution of $C_6H_5NNa_2$), a solution of 2 g. 1,4-diiodo-tetraphenyl-butadiene in 100 ml. mesitylene was added. The ammonia was then evaporated and the reaction mixture kept under reflux for seven hours. After cooling, water and benzene were added and the organic layer dried over $MgSO_4$. By chromatography on $Al_2O_3$, 0.04 g. pentaphenylpyrrole (M.P.: 286–288° C.) was isolated using as eluant a mixture of petroleum ether and benzene.

The heterocyclic systems prepared employing the process of this invention are important intermediates for many organic systems. For example, they may be used in the preparation of dyes, pigments, pharmaceuticals, or for the preparation of organo-metallic complexes in a manner similar to that disclosed in copending application Serial No. 784,040, filed in the names of K. W. Hubel and E. Weiss on Dec. 31, 1958, and now abandoned.

In addition, many of the five-membered heterocyclic compounds are strongly fluorescent materials and may be employed as such. Exemplary of such fluorescent heterocyclic systems are the arsoles, phospholes, stiboles, and siloles. In this regard, these compounds generally exhibit a yellow green, fluorescence comparable to that of zinc or cadmium sulfides. The fluorescent spectrum can be often shifted to the corresponding oxide thereby making it possible to variably provide a fluorescent compound and the particular fluorescent spectrum desired.

The hetero-containing compounds of this invention also behave as dienes and can, therefore, be involved in Diels-Alder reactions. For example, the reaction of pentaphenylphosphole with the dimethyl ester of aceylene dicarboxylic acid yields the dimethyl ester of tetraphenylphthalic acid in almost quantitative amounts. A normal adduct is also obtained by Diels-Alder addition with maleic anhydride. The linear hetero-atom containing compounds are also useful as intermediates for drug and pharmaceutical preparations.

Another general use for the metal containing compounds prepared by the process of this invention is as anti-knock additives in motor fuels either alone or in conjunction with other organo-metallic compounds. They could also be used as metal-plating agents. For this use the metal containing compounds obtainable by the process of this invention are contacted with a platable substrate at a temperature above the decomposition temperature of the metal containing compound, either in solution or in a vapor phase. A platable substrate will be, for instance, glass cloth, a metal or a plastic surface or the like.

What is claimed is:

1. A process for the preparation of heterolinear and heterocyclic organic compounds which comprises reacting a butadiene derivative having the formula:

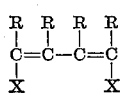

wherein X represents a halogen and wherein R represents a member selected from the class consisting of hydrogen, and alkyl and aryl groups; with a reactant represented by the formula:

$(A)_zE(R')_y$ wherein A represents a member bonded to E selected from the group consisting of an alkali metal, and an alkaline earth metal; E represents an element selected from the group consisting of gold, zinc, cadmium, mercury, boron, aluminum, gallium, indium, thallium, the lanthanides, silicon, germanium, tin, lead, titanium, zirconium, hafnium, nitrogen, phosphorus, arsenic, antimony, bismuth, vanadium, niobium, tantalum, oxygen, sulfur, selenium, tellurium, iron, cobalt, nickel, palladium and platinum; R' represents a member bonded to E selected from the class consisting of hydrogen and alkyl and aryl groups; z is an integer having a value of from 1 to 2; and y is an integer having a value of from 0 to 4; the sum of z and y being such that the valence of E is satisfied.

2. A process according to claim 1, in which X is iodine and R is phenyl.

3. A process according to claim 1, in which X is chlorine and R is hydrogen.

4. A process according to claim 1, in which A is sodium.

5. A process according to claim 1, in which A is lithium.

6. A process according to claim 1, in which stoichiometric amounts of the reactants are employed.

7. A process according to claim 1, in which the reaction is carried out at a temperature of between −40° C. and 300° C.

8. A process according to claim 7, in which the reaction is carried out at a temperature of between 20° C. and 220° C.

9. A process for the preparation of heterolinear organic compounds which comprises reacting a butadiene derivative having the formula:

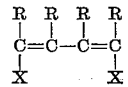

wherein X represents a halogen and R repersents a member selected from the class consisting of hydrogen, and alkyl and aryl groups; with a reactant represented by the formula:

$(A)_zE(R')_y$ wherein A represents a member bonded to E selected from the group consisting of an alkali metal, and an alkaline earth metal; E represents an element selected from the group consisting of gold, zinc, cadmium, mercury, boron, aluminum, gallium, indium, thallium, the lanthanides, silicon, germanium, tin, lead, titanium, zirconium, hafnium, nitrogen, phosphorus, arsenic, antimony, bismuth, vanadium, niobium, tantalum, oxygen, sulfur, selenium, tellurium, iron, cobalt, nickel, palladium, and platinum; R' represents a member bonded to E selected from the class consisting of hydrogen and alkyl and aryl groups; z is an integer having a value of 1; and y is an integer having a value of from 0 to 4; the value of y being such that the valence of E is satisfied.

10. A process for the preparation of five-membered heterocyclic organic compounds which comprises reacting a butadiene derivative having the formula:

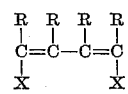

wherein X represents a halogen and R represents a member selected from the class consisting of hydrogen, and alkyl and aryl groups; with a reactant represented by the formula:

$(A)_zE(R')_y$ wherein A represents a member bonded to E selected from the group consisting of an alkali metal, and an alkaline earth metal; E represents an element selected from the group consisting of gold, zinc, cadmium, mercury, boron, aluminum, gallium, indium, thalium, the lanthanides, silicon, germanium, tin, lead, titanium, zirconium, hafnium, nitrogen, phosphorus, arsenic, antimony, bismuth, vanadium, niobium, tantalum, oxygen, sulfur, selenium, tellurium, iron, cobalt, nickel, palladium, and platinum; R' represents a member bonded to E selected from the class consisting of hydrogen and alkyl and aryl groups; z is an integer having a value of 2; and y is an integer having a value of from 0 to 4; the value of y being such that the valence of E is satisfied.

References Cited in the file of this patent

UNITED STATES PATENTS

| | | |
|---|---|---|
| 2,423,497 | Harmon | July 8, 1947 |
| 2,614,130 | Pines et al. | Oct. 14, 1952 |
| 2,658,926 | Hyman et al. | Nov. 10, 1953 |
| 2,818,416 | Brown et al. | Dec. 31, 1957 |

OTHER REFERENCES

Bergmen et al.: "Annalen der Chemie" 500, No. 2 (Jan. 20, 1933), pages 122–136.